United States Patent [19] … [11] Patent Number: 5,245,468
Demiryont et al. … [45] Date of Patent: Sep. 14, 1993

[54] ANTI-REFLECTIVE TRANSPARENT COATING

[75] Inventors: Hulya Demiryont, Farmington Hills; Roman Surowiec, Redford, both of Mich.

[73] Assignee: Ford Motor Company, Dearborn, Mich.

[21] Appl. No.: 627,672

[22] Filed: Dec. 14, 1990

[51] Int. Cl.$^5$ .............................................. G02B 5/26
[52] U.S. Cl. .................................. 359/359; 359/586; 359/589; 428/428; 204/192.27
[58] Field of Search ............... 359/580, 586, 589, 359; 204/192.26, 192.27, 192.28; 428/428

[56] References Cited

U.S. PATENT DOCUMENTS

| | | |
|---|---|---|
| 3,990,784 | 11/1976 | Gelber . |
| 4,070,097 | 1/1978 | Gelber . |
| 4,185,894 | 1/1980 | Hilton et al. . |
| 4,377,628 | 3/1983 | Ishioka et al. ................. 204/192.26 |
| 4,497,539 | 2/1985 | Sakurai et al. . |
| 4,546,050 | 10/1985 | Amberger et al. . |
| 4,599,729 | 7/1986 | Sasaki et al. ........................ 357/17 |
| 4,634,684 | 1/1987 | Dumbaugh, Jr. . |
| 4,689,873 | 9/1987 | Kramer . |
| 4,737,018 | 4/1988 | Iwashita et al. . |
| 4,765,729 | 8/1988 | Taniguchi . |
| 4,773,964 | 9/1988 | Haond . |
| 4,780,334 | 10/1988 | Ackerman . |
| 4,802,737 | 2/1989 | Denton . |
| 4,815,821 | 3/1989 | Nonogaki et al. . |
| 4,822,120 | 4/1989 | Fan et al. . |
| 4,822,748 | 4/1989 | Janesick et al. . |
| 4,846,151 | 7/1989 | Simko, Jr. . |

OTHER PUBLICATIONS

Pawlewicz et al., *Optical Thin Film—Recent Developments in Reactively Sputtered Optical Thin Films*, Proceedings of the SPIE, vol. 325, pp. 105–112 (Jan. 26–27, 1982).
Pawlewicz et al., *Improved Si-Based Coating Materials for High Power Infrared Lasers*, (Nov., 1981).
Zarani et al., *Optical Properties of UV Laser Photolytic Deposition of Hydrogenated Amorphous Silicon (a–Si:H)*, J. Appl. Phys., vol. 60, No. 7, p. 2523, Oct. 1, 1986.
Stone et al., *Reflectance, Transmittance and Loss Spectra of Multilayer Si/SiO₂ Thin Film Mirrors and Antireflection Coatings for 1.5 μm*, Applied Optics, vol. 29, No. 4 (Feb. 1, 1990).
Pawlewicz et al., *1315 NM Dielectric Mirror Fabrication by Reactive Sputtering* presented at the Topical Meeting on High Power Laser Optical Components held at Boulder, Colo. in Oct. 1984.
Martin et al., *Optical Coatings for Energy Efficiency and Solar Applications*, Proceedings of the SPIE, vol. 324, pp. 184–190 (Jan. 28–29, 1982).

*Primary Examiner*—Bruce Y. Arnold
*Assistant Examiner*—J. P. Ryan
*Attorney, Agent, or Firm*—Roger L. May; Lorraine S. Melotik

[57] ABSTRACT

An anti-reflective coating employing $Si_{1-x}H_x$ as a high refractive index material in a film pair together with $SiO_2$ as a low refractive index material is found to be substantially transparent to visible light and to provide good anti-reflectance where the $Si_{1-x}H_x$ film is ultra-thin, preferably less than about 80 Angstroms, and the thickness of the $SiO_2$ film is matched to that of the $Si_{1-x}H_x$ film. Laminated glazing units having such anti-reflective film can be used, for example, even in applications requiring high transmittance of visible light, such as motor vehicle windshields, in view of the substantial transparency of the coating.

19 Claims, 3 Drawing Sheets

ANTI-REFLECTIVE TRANSPARENT COATING

The present invention is directed to an anti-reflective coating which is substantially transparent to visible light wavelengths. The anti-reflective coating of the invention is particularly suitable for use on glazing units, such as automotive and architectural windows.

BACKGROUND OF THE INVENTION

Anti-reflective coatings have been used in various applications for some time. Exemplary applications include lenses, glazing units, mirrors and the like. It is becoming desirable to use anti-reflective coatings on architectural and automotive glazing units, especially on the inside and/or outside surfaces of motor vehicle windshields. A suitable anti-reflective coating on the inside surface of a motor vehicle windshield would facilitate the use of lighter colored instrument panel materials. Without an anti-reflective coating, vision through the windshield might be impaired by light from the upper surface of such lighter colored instrument panel reflecting on the inside surface of the windshield. An anti-reflective coating on the outside of a windshield increases transmitted light intensity and helps meet applicable minimum transparency requirements. Presently, minimum transmittance of visible light for motor vehicle windshields is 70% in the United States and 75% in Europe. Therefore, to be suitable for use in a vehicle windshield or other glazing application, the anti-reflective coating must not reduce the transparency of the glazing unit to an unacceptable degree.

Numerous anti-reflective coatings are known, many of which comprise a film stack in which a first film of relatively high refractive index material is paired with a second film of lower refractive index material. Thus, for example, U.S. Pat. No. 4,846,151 to Simko, Jr. suggests that various surfaces of transparent plates used in solar collectors can be coated with an anti-reflective material. Exemplary materials are listed, including multi-layer coatings such as silicon dioxide paired with aluminum oxide or titanium dioxide. Similarly, U.S. Pat. No. 4,822,748 to Janesick et al suggests the use of an anti-reflective coating on glass used in picture frames and the like. Specifically, it suggests the preparation of a triple layer film stack in which a film of titanium oxide is sandwiched between films of silicon dioxide. Other materials, such as zirconium oxide, tantalum oxide and magnesium oxide also are mentioned. The use of silicon monoxide is suggested as an anti-reflective coating for optical parts made of synthetic resin in U.S. Pat. No. 4,497,539 to Sakurai et al. Silicon monoxide also is suggested, as is silicon dioxide, as an anti-reflective layer having high infrared reflectivity and high visible light transmission suitable for use in heat-mirrors in U.S. Pat. No. 4,822,120 to Fan et al. In U.S. Pat. No. 4,815,821 to Nonogaki et al a light transmitting glass panel is suggested having on its surface a coating consisting of a silicon monoxide layer over a titanium oxide layer. The silicon monoxide layer is said to be intermittently spaced from the titanium dioxide layer by a light absorbing layer of colloidal carbon. A transparent optical article, such as a lens, is suggested in U.S. Pat. No. 4,765,729 to Taniguchi. Silicon dioxide is suggested as a suitable anti-reflective coating for the surface of the article.

The use of an anti-reflective coating on both the inside and the outside of an ophthalmic lens is suggested in U.S. Pat. No. 4,070,097 to Gelber. Each of the two coatings is said to have two layers, a dielectric layer and a metal layer. For the metal layer, suitable materials are said to include nickel, chromium, Inconel and Nichrome (a material comprised essentially of nickel and chromium). The metal layer is said typically to have a thickness ranging from 10 to 40 Angstroms. Various materials, including silicon dioxide, are listed for the dielectric layer. A second U.S. patent to Gelber, U.S. Pat. No. 3,990,784, is directed to coated architectural glass having a multi-layer coating on its surface. The coating is said to comprise first and second metal layers spaced from each other by a dielectric layer disposed between them. An additional metal oxide layer is said to be used optionally for anti-reflective purposes. Nickel is mentioned as being a suitable metal together with silicon dioxide as the dielectric layer.

The optical properties of silicon/silicon dioxide multilayer systems are discussed in Stone et al., *Reflectance, Transmittance and Lost Spectra of Multilayer Si/SiO$_2$ Thin Film Mirrors and Antireflection Coatings For 1.5 $\mu m$.* Applied Optics, Vol. 29, No. 4 (1 Feb. 1990). Stone et al suggest that in the spectral region between 1.0 and 1.6 $\mu m$, a useful and easy to handle combination of paired layers is silicon and silica. The paper is directed to the fabrication of multilayer systems. It is noted therein that the greater the difference in the index of refraction of the paired layers, the fewer the number of layers will be needed to obtain a desired level of reflectance. Silicon is noted to have a relatively high index of refraction. The paper states that silicon cannot be used as a material in the film pair for light below about 1.0 $\mu m$ wavelength, for visible light, for example, due to its high absorption of light in that range. Visible light has a wavelength in the range of about 0.4 to 0.75 $\mu m$. Thus, while suggesting that a simple two layer anti-reflection coating can be made using silicon and silicon dioxide, the article clearly teaches that such anti-reflection coating is not suitable for applications requiring transparency to visible light. The article notes that Si/SiO$_2$ film pairs for high reflectance mirrors and anti-reflection coatings have been deposited by reactive sputtering. The coatings discussed in the paper are said to have been deposited by electron beam evaporation onto glass substrates. The anti-reflection coatings described in the Stone et al article are said to consist of a layer of silicon about 150 Angstroms thick with a layer of SiO$_2$ thereover having a thickness selected to yield minimum reflection. A silicon layer of that thickness is substantially opaque to visible light and reflectance percentage is shown in the paper only for light far above the visible wavelength range. For a layer of silicon of that thickness, a SiO$_2$ layer of about 2800 Angstroms is employed by Stone et al. It is further stated that the minimum reflectance value is not very sensitive to the thickness to the silicon layer over a thickness range between 75 and 200 Angstroms. Even at the low end of this thickness range, however, the layer of silicon would be substantially opaque to the visible light component of ordinary sunlight.

Similar teaching is presented in Pawlewicz et al., *1315 nm Dielectric Mirror Fabrication By Reactive Sputtering* presented at the Topical Meeting on High Power Laser Optical Components held at Boulder, Colo. on Oct. 18–19, 1984. Low levels of light absorption are reported in that paper for five reactively sputtered amorphous optical coating materials, including a Si:H/SiO$_2$ film pair. The low absorption was measured for light in the 1.3 μm range and it is taught in the conclusion of the paper that the Si:H material is not useable at visible wavelengths. The same point is made in Pawlewicz et al., *Optical Thin Films-Recent Developments In Reactively Sputtered Optical Thin Films*, Proceedings of the SPIE, Vol. 325, pp. 105-112 (Jan. 26-27, 1982). Table 1 of that paper lists light wavelengths of 1,000 to 9,000 nm (1.0 to 9.0 μm) as the range for which optical coatings of silicon are useful. Thin film coatings of $Si_{1-x}H_x$ for reducing light absorption of infrared laser wavelengths 1.06, 1.315 and 2.7 μm are discussed in Pawlewicz et al., *Improved Si-Based Coating Materials for High Power Infrared Lasers* (November, 1981).

The optical properties of Si:H are discussed also in Martin et al., *Optical Coatings for Energy Efficiency and Solar Applications*, Proceeding of the SPIE, Vol. 324, pp. 184-190 (Jan. 28-29, 1982). The effect is discussed of hydrogen content and Si:H bonding on various optical properties at 2 μm, a non-visible wavelength. Multilayer $Si:H/SiO_2$ laser mirrors with reflectance greater than 99% at non-visible wavelengths 1.315, 2.7 and 3.8 μm also are described. The article notes that $Si:H/SiO_2$ multilayer coatings are easily fabricated by sputtering, since only a single Si target is required, with either $H_2$ or $O_2$ being introduced into the sputtering chamber to form Si:H and $SiO_2$ layers, respectively. The high absorption coefficient in the visible region is said to make thin films of Si:H suitable for use in solar cells to absorb solar radiation.

Various glazing product needs would be met by a new anti-reflective coating system which is substantially transparent to visible light and which can be deposited onto a substrate surface by economical and industrially feasible techniques. In addition, certain glazing applications, such as the above mentioned inside surface of a motor vehicle windshield, require relatively hard and durable anti-reflective coating systems. It is an object of the present invention to provide an anti-reflective coating system, or a glazing unit having an anti-reflective coating thereon, which meets one or more of these product needs. Additional features and aspects of the invention will be understood from the following disclosure and description thereof.

SUMMARY OF THE INVENTION

According to a first aspect of the invention, an anti-reflective coating system comprises a film stack having a high index of refraction material paired with a low index of refraction material, specifically, an ultra-thin film of hydrogenated silicon, $Si_{1-x}H_x$ is paired with a thicker film of silicon dioxide, x being a positive number less than about 0.4. The anti-reflective coatings of the invention are substantially transparent to visible light. This is surprising, since it is well known that $Si_{1-x}H_x$ exhibits strong absorption in the visible wavelength region. For that reason $Si_{1-x}H_x$ has not previously been considered suitable for use in anti-reflective coatings on glazing units, that is, applications requiring transparency. Because of its high absorption of visible light, it would not have been thought possible prior to the present invention to use $Si_{1-x}H_x$ alone or in a film pair with silicon dioxide or other material for an anti-reflective coating which is substantially transparent to visible light. Nevertheless, the present invention employs $Si_{1-x}H_x$ effectively in a substantially transparent anti-reflective coating system. Specifically, an ultra-thin film of $Si_{1-x}H_x$, preferably about 30 Angstroms to about 80 Angstroms thick, is surprisingly found to be able to function effectively as the high refractive index material in a film pair with silicon dioxide if the silicon dioxide is appropriately matched in film thickness to the $Si_{1-x}H_x$ film. That is, it is found able to operate together with a film of silicon dioxide of appropriate thickness as a high refractive index/low refractive index film pair.

According to another aspect of the present invention, a glazing unit is provided having on one or more surfaces an anti-reflective coating as described above. The silicon dioxide film, as the exterior film of the film pair, is found to act as a hard protective layer, providing good durability for the anti-reflective coating. Thus, for example, the anti-reflective coating system of the invention functions advantageously in a motor vehicle environment as an anti-reflective coating on a motor vehicle windshield. The anti-reflective coating functions on the inside surface to reduce reflected light from the dashboard. On the outside surface it increases transmittance of visible light to the interior. The $Si_{1-x}H_x$ and silicon dioxide films can be deposited by sputtering and other methods which are commercially known and economically and industrially feasible. The coating is especially suitable for use on silicon based glass, in which applications especially durable interfacial adhesion is obtained. Additional features and advantages of the invention will be understood by those skilled in the art in view of the foregoing disclosure and the following detailed description of certain preferred embodiments.

BRIEF DESCRIPTION OF THE DRAWINGS

The following detailed description of certain preferred embodiments of the invention will include discussion of the appended drawings in which.

Figure 1:
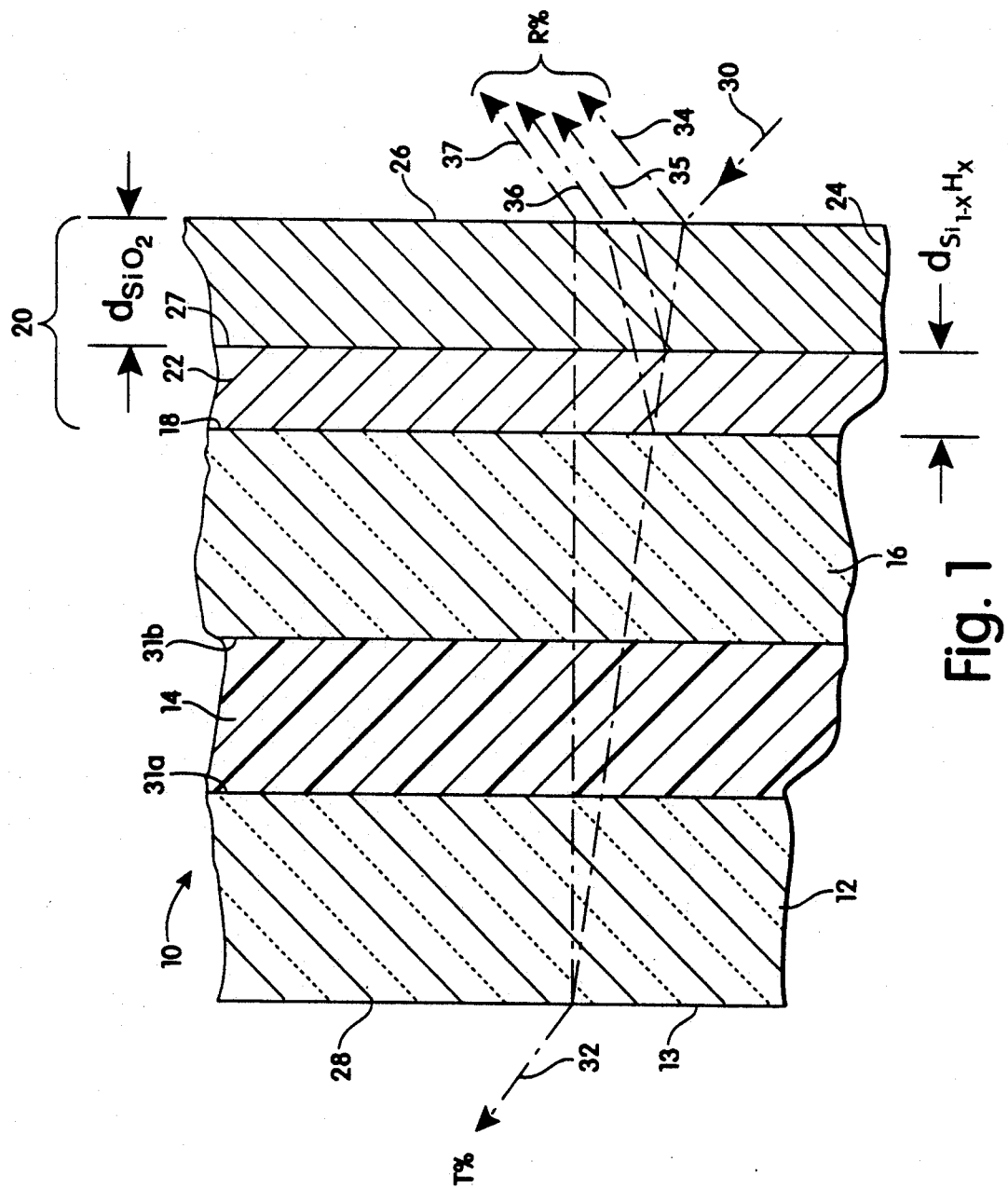
FIG. 1 is a cross-sectional view of a laminated motor vehicle windshield comprising an anti-reflective coating in accordance with a preferred embodiment of the present invention.

It should be understood that features and elements of the embodiments of the invention illustrated in FIG. 1 are not necessarily precisely to scale. The thicknesses of the films of the anti-reflective coating are shown larger than true scale, for example, for ease of illustration and understanding.

DETAILED DESCRIPTION OF PREFERRED EMBODIMENTS

In the light of the present disclosure numerous applications of the present invention will be apparent to those skilled in the art. For purposes of exemplification, the invention is described with reference to certain preferred embodiments comprising a motor vehicle windshield having an anti-reflective coating in accordance with the invention on its inside surface (i.e., the surface exposed to the passenger compartment of the motor vehicle). The anti-reflective coatings of the invention, and windshield glazing units having the same, provide several significant advantages. The glass currently used in motor vehicle windshields is typically a silicon based composition. The silicon based anti-reflective coatings of the invention are found to have good interfacial adhesion with a silicon based glass substrate. In addition, the silicon dioxide film forming the exposed surface of the glazing unit provides a hard and durable surface well adapted to the use environment experienced by a motor vehicle windshield.

It should be understood that reference to the anti-reflective coating of the invention and to glazing units comprising the same as being substantially transparent to visible light will generally, unless otherwise stated, mean a transmittance value of at least about 50%, and preferably at least about 70%, to meet current federal guidelines for motor vehicle windshields and also product specifications for certain architectural applications. The term visible light is used broadly to mean light anywhere in a wavelength range which is perceptible to a human observer. It is generally accepted that visible light is in the wavelength range of about 400 to 750 nm. In the visible wavelength range, percent transmittance plus percent absorption plus percent reflection equals 100%. For glazing units in which the substrate is untinted glass or the like, the absorption of visible wavelength light is negligible, such that the percent transmittance plus the percent reflectance can be taken as equaling 100% for the purposes of this discussion.

Referring now to FIG. 1, a cross sectional view of a motor vehicle windshield 10 is seen to comprise an exterior ply 12 laminated by a polyvinylbutyral (PVB) laminating ply 14 to a substrate ply 16. An anti-reflective coating 20 in accordance with the invention is carried on exposed surface 18 of substrate ply 16. Exterior ply 12 and substrate ply 16 each can be made of plastic or, more preferably, glass. In any event, substrate ply 16 preferably is substantially rigid and inextensible, such that the thin films making up anti-reflective coating 20 are not disrupted by stretching of substrate ply 16 during the lamination process or during the installation or use of the glazing unit.

Anti-reflective coating 20 in the preferred embodiment of FIG. 1 consists of film 22 of hydrogenated silicon, $Si_{1-x}H_x$, carried directly on surface 18 of substrate ply 16. Film 24 of silicon dioxide is carried directly over $Si_{1-x}H_x$ film 22. It will be recognized by those skilled in the art that the thicknesses of the various plys and films are not to scale. Films 22 and 24 are exaggerated for ease of illustration and better understanding. Although not necessary in all applications, an anti-reflective coating on a windshield typically will be coextensive with the inside surface thereof.

$Si_{1-x}H_x$ has a refractive index which varies with the value of x. At a value of 0.11 the index of refraction of a sputtered $Si_{1-x}H_x$ film, at 2 μm wavelength, is about 3.45. The above-mentioned Martin et al paper, *Optical Coatings for Energy Efficiency and Solar Applications*, presents a plot (FIG. 5) of the refractive index of a sputtered $Si_{1-x}H_x$ film as a function of the value of x at 2 μm wavelength, the same being hereby incorporated by reference. As discussed above, the usefulness of $Si_{1-x}H_x$ as the high refractive index material in a film pair intended for use as a transparent anti-reflective coating is highly surprising in view of the strong absorption of $Si_{1-x}H_x$ in the visible wavelength region. The present invention overcomes this difficulty, in part, through the use of an ultra-thin film of $Si_{1-x}H_x$. Anti-reflective efficacy is obtained notwithstanding that the high refractive index material is so thin. Specifically, it has been found that anti-reflective efficacy is achieved with an ultra-thin $Si_{1-x}H_x$ film coupled with a film of silicon dioxide of appropriate thickness as the low refractive index material. Silicon dioxide has a refractive index of about 1.46. The $Si_{1-x}H_x$ film preferably is about 30 to 80 Angstroms thick, more preferably about 40 to 60 Angstroms, and most preferably about 50 Angstroms. The value of x preferably is about 0.05 to 0.2, most preferably about 0.11. The $SiO_2$ film preferably is about 1000 to 1700 Angstroms, more preferably about 1200 to 1600, most prefereably about 1400. These preferences are based on the optical properties of the resulting anti-reflective coating, including especially the percent reflectance and percent transmittance of a coated glazing unit.

As discussed further below in connection with FIGS. 1-5, a most preferred embodiment, specifically, a laminated motor vehicle windshield having an anti-reflective coating comprising a 1400 Angstrom thick film of $SiO_2$ directly over a 50 Angstrom thick film of $Si_{1-x}H_x$, where x is about 0.11, is found to have only about 4% total reflectance of visible light. This is half the reflectance of the same glazing unit without the anti-reflective coating of the invention. Reflectance from the coated glass surface is reduced very nearly to zero percent. The glass maintained its substantial transparency to visible light.

The $Si_{1-x}H_x$ and silicon dioxide films of the anti-reflective coatings of the invention can be made employing equipment and techniques which are commercially available and well known to those skilled in the art. Thus, the films can be deposited onto a glass or other substrate surface by reactive sputtering and can also be deposited by chemical vapor deposition techniques, preferably using silane or higher order silanes as a donor gas and helium as a carrier gas. It is contemplated that increases in the thickness of the films may be achievable while still meeting a given transparency requirement by appropriately adjusting the deposition parameters or technique or by using alternative deposition methods. In general, it is an advantage of the invention that the $Si_{1-x}H_x$ film can be deposited quickly and, hence, economically because it is so thin. Typically, the $Si_{1-x}H_x$ film is deposited onto a surface of a ply, for example, a glass sheet, and the silicon dioxide film is deposited over the $Si_{1-x}H_x$ film.

In one alternative method, a thin interface film of silicon, preferably about 50 to 150 Angstroms, is deposited on the glass surface and then heated, preferably at the glass bending temperature, while bending the glass in air, prior to depositing the $Si_{1-x}H_x$ and $SiO_2$ films. The silicon film is sufficiently thin that the glass clears during the heating and bending. While not intending to be bound by theory, it is believed that the silicon is oxidized. In any event, the heating improves adhesion of the antireflective coating to the glass substrate. It also improves the mechanical, and likely the chemical, durability of the film stack. It appears that this method provides a diffuse interface between the anti-reflective coating and the glass substrate. According to a preferred embodiment of this coating method, a silicon film is deposited, on the surface of a glass ply. The glass ply then is heated to an elevated temperature, typically at least about 1000° F., for example 1040° F., and preferably to the bending temperature of the glass, typically about 1250° F. After heating at such elevated temperature for a time sufficient to alter the optical properties of the silicon, preferably at least about fifteen minutes at 1250° F., the glass is slowly cooled to room temperature. After such process, the $Si_{1-x}H_x/SiO_2$ coating is applied.

In a preferred method of the invention a substantially transparent laminated glazing unit is fabricated by sputtering a 30 to 80 Angstroms, more preferably about 40 to 60 Angstroms, thick $Si_{1-x}H_x$ film onto a major surface of a substantially inextensible substrate ply. A 1000 to 1700 Angstroms, more preferably about 1200 to 1600 Angstroms, thick silicon dioxide film is sputtered over the $Si_{1-x}H_x$ film. The substrate ply then is laminated to another ply of glass, plastic, etc. by means of a laminating ply of PVB or other flexible polymeric material. Specifically, the laminating ply is sandwiched between the substrate ply and the additional ply and they are laminated, usually by application of heat and pressure and perhaps vacuum. Preferably the surface of the substrate ply carrying the anti-reflective coating is positioned as an exterior surface of the glazing unit closest to the viewer.

The path of incident light through a glazing unit having an anti-reflective coating in accordance with the invention is illustrated in FIG. 1. Specifically, incident light 30 strikes the surface 26 of the anti-reflective film 20 and a substantial portion thereof passes through the anti-reflective coating and the remainder of the glazing unit to exit through surface 13 of exterior ply 12 as transmitted light 32. Typically, a portion of incident light is reflected back at each interface between materials of different refractive indexes. Virtually no light is reflected back at either of the two glass/PVB interfaces 31a and 31b, because the refractive index of glass is so close to that of PVB. Normally, approximately 4% of incident light is reflected back at a glass/air interface. Thus, as noted above and as marked in FIG. 2, bare glass has a total reflectance R of about 8%, that is, 4% from each surface of the glass. In certain most preferred embodiments of the present invention, total reflectance is reduced to as low as about 4% using an anti-reflective coating on one surface. Specifically, the reflectance from the surface carrying the anti-reflective coating of the invention is reduced nearly to 0%, leaving only the 4% from the air/glass interface at the opposite glass surface. In another preferred embodiment an anti-reflective coating is employed on both surfaces and reflectance is reduced nearly to zero for the glazing unit.

This can be better understood with reference to FIG. 1. Incident light 30 strikes surface 26 of anti-reflective coating 20. Total reflectance R, expressed as a percentage of incident light 30, includes: (i) light 34 reflected at the air/$SiO_2$ interface at surface 26; (ii) light 35 reflected at the $SiO_2/Si_{1-x}H_x$ interface 27; (iii) light 36 reflected at the $Si_{1-x}H_x$/glass interface at surface 18 and (iv) light 37 reflected from the glass/air interface at surface 28. As noted above, the two glass/PVB interfaces can be ignored, since the refractive index of the two materials is almost identical. The percentage passing through surface 13 is the transmittance percentage T%. Reflectance from glass surface 18 without the anti-reflective coating of the invention would be about 4%, as noted above. According to certain most preferred embodiments of the invention, such reflectance with anti-reflective coating 20 thereon, i.e., the sum of 34 plus 35 plus 36, equals approximately zero. Thus, the reflectance for the glazing unit is only about 4% in total, virtually all of that amount being contributed by reflectance 37. While substantial reflectance would have been expected at the $Si_{1-x}H_x$/glass interface, because of the large difference in the refractive index of those materials, reflectance 36 is, in fact, essentially zero.

While not intending to be bound by theory, it presently is understood that reflectance 36 is essentially zero because the ultra-thin $Si_{1-x}H_x$ film is too thin to establish an optically significant interface with the glass. As noted above, of course, it has been found nevertheless sufficient to act as the high refractive index material with $SiO_2$ in the anti-reflective film pair of the invention. It will be understood from the foregoing that an embodiment of the invention further comprising an anti-reflective coating on surface 13 of exterior glass ply 12 would have total reflectance of approximately zero.

The optical properties, specifically transmittance and reflectance, of anti-reflective coatings of the invention are shown in the graphs of FIGS. 2 through 5. Spectrophotometric reflectance (R%) and transmittance (T%) values were calculated using a computer program adapted to give integrated R and T values of UV, visible, and IR regions for a given angle of incidence on a multi-film coating on a glass substrate. Literature values of the optical constants, the refractive index and extinction coefficient of $Si_{1-x}H_x$ and silicon dioxide films, were used in calculating the R and T values. The computer program was provided T% and R% values for $d_{Si}$ and $d_{SiO2}$ parametric values. Plots were drawn for R as a function of $d_{Si}$ and T as a function of $d_{Si}$ for parametric thicknesses of $SiO_2$ films. These curves were used to decide the thicknesses of experimentally deposited $Si_{1-x}H_x$ and $SiO_2$ pairs providing minimum reflection with maximum transmission. The following actual pairs of $Si_{1-x}H_x/SiO_2$ (for x=0) were sputtered from a Si target: 60/1000; 40/1000; 20/1000; 20/1200; 30/1200; 25/1200; 27/1500; 27/2000. Spectrophotometer reflectance and transmittance plots of these actual samples were obtained using a Perkin-Elmer Lambda 9 spectrophotometer. The experimental results agreed very well with values predicted by the multi-film computer program. The results shown in FIGS. 2 through 5 were then determined by the computer program for coatings according to the present invention, employing hydrogenated silicon. The values were calculated for normal incidence. A similar procedure was applied to oblique incidence, including 65° which is the installation angle of a typical motor vehicle windshield (as viewed by a driver of the vehicle). The best results were obtained for a $Si_{1-x}H_x/SiO_2$ film pair having a 1400 Angstrom thick $SiO_2$ film directly over a 50 Angstrom thick $Si_{1-x}H_x$ film where x was 0.11.

Figure 2:
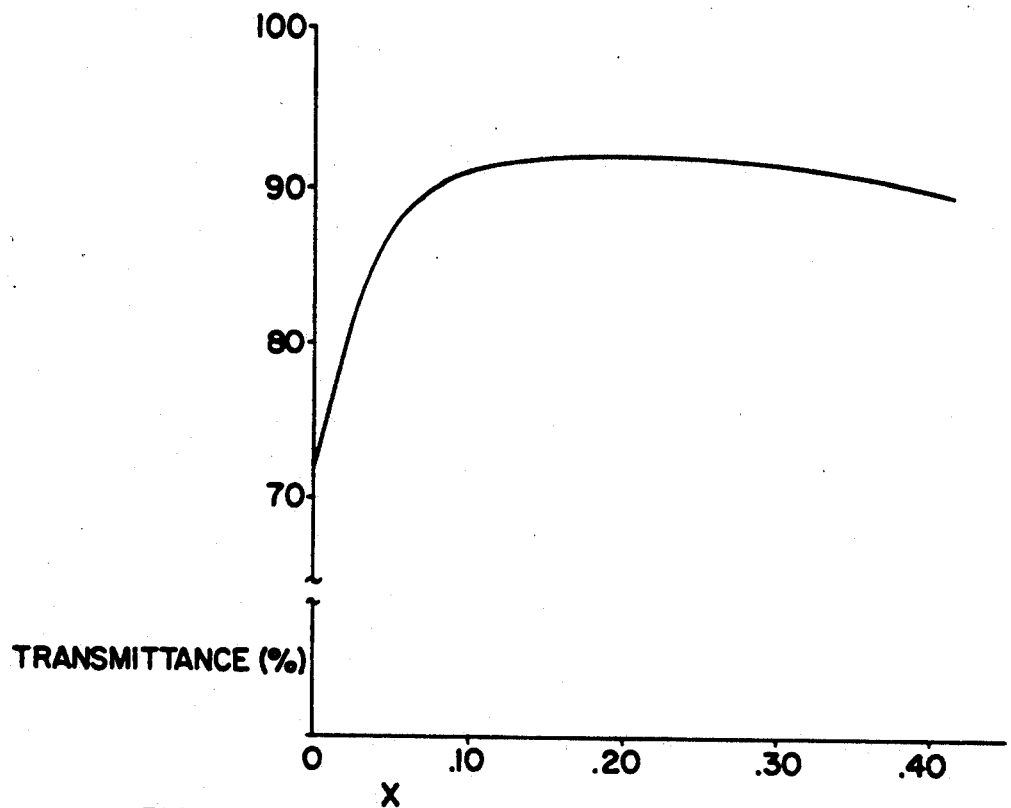
FIG. 2 is a graph showing percent transmittance of visible light through the glazing unit of FIG. 1 as a function of the degree of hydrogenation of the $Si_{1-x}H_x$ film, that is, as a function of the value of x.
Figure 3:
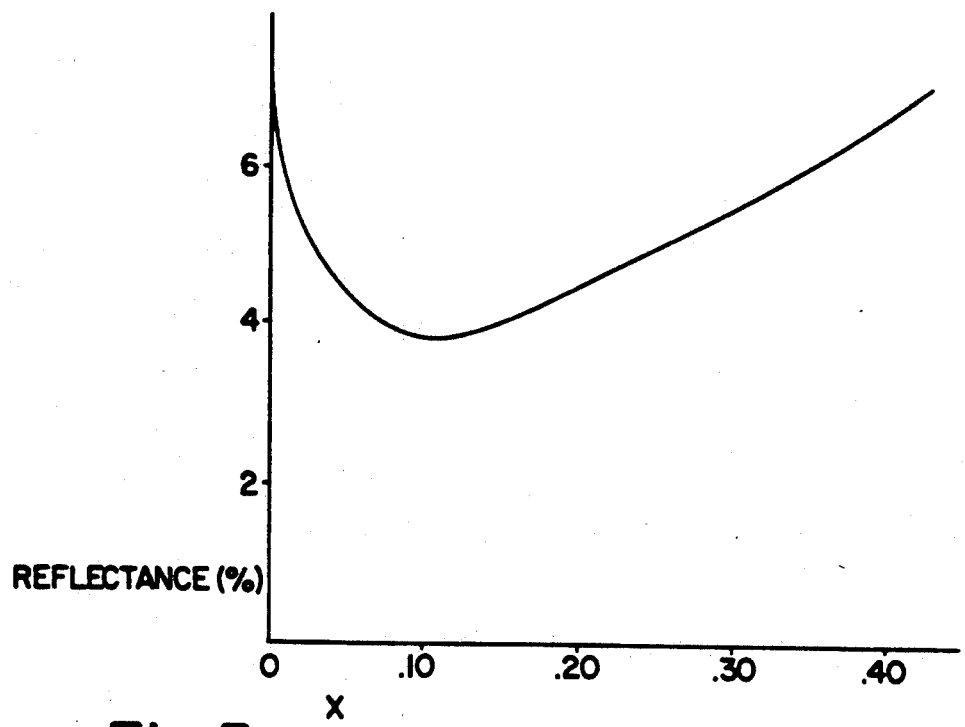
FIG. 3 is a graph showing percent reflectance of visible light from the glazing unit of FIG. 1 as a function of the degree of hydrogenation of the $Si_{1-x}H_x$ film.

In FIG. 2 the percent transmittance T of middle visible light (approximately 550 nm) is shown as a function of the value of x for an $Si_{1-x}H_x/SiO_2$ anti-reflective coating on a glass substrate. The $Si_{1-x}H_x$ film thickness is 50 Angstroms and the $SiO_2$ film thickness is 1400 Angstroms, in accordance with a highly preferred embodiment of the invention. Percent reflectance R is shown for this glazing unit in FIG. 3, again as a function of the value of x. It can be seen from FIGS. 2 and 3 that transmittance is maximized and reflectance minimized for values of x between about 0.05 and 0.2, with an optimal value being about 0.11.

Figure 4:
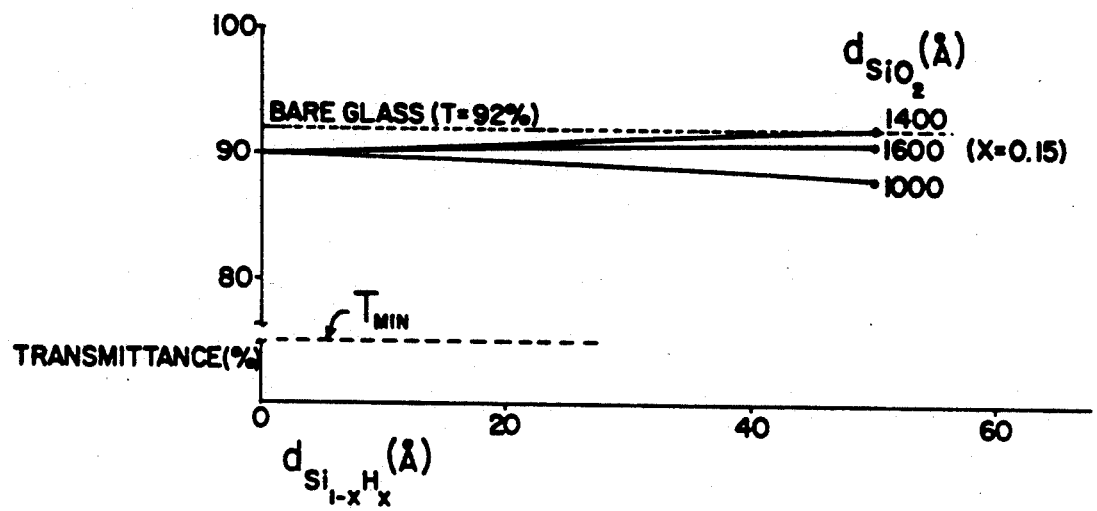
FIG. 4 is a graph showing percent transmittance of visible light through the glazing unit of FIG. 1, as a function of $Si_{1-x}H_x$ film thickness, for several silicon dioxide film thicknesses.

In FIG. 4 the percent transmittance of visible light is shown as a function of the thickness $d_{SiH}$ of the hydrogenated silicon film for several different silicon dioxide film thicknesses $d_{SiO2}$. The silicon film was 15% hydrogenated. That is, x was about 0.15. The 92% transmittance of the bare glass substrate used for the test samples is indicated in the graph. Also the 70% transmittance $T_{min}$ currently required by United States federal guidelines for motor vehicle windshields is indicated. It can be seen that where the $SiO_2$ film is 1400 Angstroms thick, transmittance is optimal at about 50 Angstroms of $Si_{0.85}H_{0.15}$. Thinner films are generally preferred over thicker films, if performance requirements are met, since they can be deposited by sputtering or other method more quickly and, hence, are generally more economical and result in higher productivity.

Figure 5:
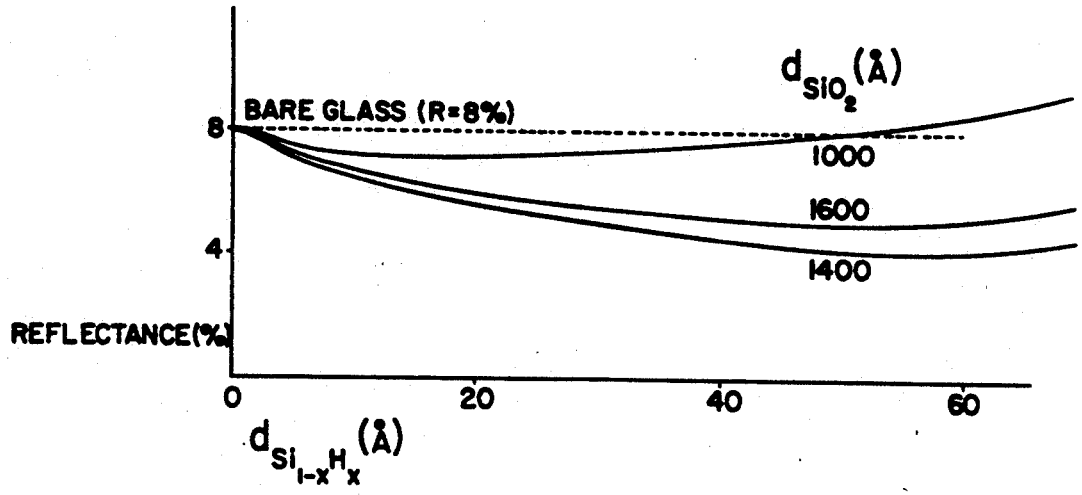
FIG. 5 is a graph showing percent reflectance of visible light from the glazing unit of FIG. 1 (i.e., from the surface bearing the anti-reflective coating of the invention), as a function of $Si_{0.85}H_{0.15}$ film thickness, for several silicon dioxide film thicknesses.

Referring now to FIG. 5, the percent reflectance of the laminated glazing unit for which transmittance is shown in FIG. 4, having an anti-reflective coating of the invention, is shown as a function of hydrogenated silicon film thickness for a variety of silicon dioxide film thicknesses. The 8% reflectance of bare glass is indicated in the graph. It can be seen that a film pair having about 50 Angstroms hydrogenated silicon (x=0.15) and 1400 Angstroms silicon dioxide has reflectance of visible light as low as about 4%.

While various exemplary and preferred embodiments of the invention have been described above, it will be apparent to those skilled in the art, in the light of this disclosure, that variations and modifications can be made without departing from the true spirit of the invention. All such variations and modifications are intended to be included within the scope of the appended claims.

We claim:

1. An anti-reflective coating comprising an $Si_{1-x}H_x$ film and a silicon dioxide film over the $Si_{1-x}H_x$ film, x being a positive number less than 0.4, the anti-reflective coating having a transmittance of at least 50% to visible light.

2. The anti-reflective coating of claim 1 wherein the $Si_{1-x}H_x$ film is less than about 80 Angstroms thick and the $SiO_2$ film is 1000 to 1700 Angstroms thick.

3. The anti-reflective coating of claim 1 wherein the $Si_{1-x}H_x$ film has a thickness between 30 and 80 Angstroms, the $SiO_2$ film is directly on the $Si_{1-x}H_x$ film and has a thickness between 1200 and 1600 Angstroms, and x is between 0.05 and 0.2.

4. An anti-reflective coating comprising an $Si_{1-x}H_x$ film having a thickness of about 50 Angstroms and a $SiO_2$ film directly on the $Si_{1-x}H_x$ film having a thickness of about 1400 Angstroms, x being about 0.11, the anti-reflective coating having at least 70% transmittance and less than 8% reflectance of visible light incident on the anti-reflective coating.

5. A glazing unit comprising a glazing substrate having a transmittance of at least 50% to visible light and an anti-reflective coating having a transmittance of at least 50% visible light on a surface of the glazing substrate, the anti-reflective coating comprising an $Si_{1-x}H_x$ film and a $SiO_2$ film over the $Si_{1-x}H_x$ film, x being a positive number less than 0.4.

6. The glazing unit of claim 5 wherein the anti-reflective coating is on a major exterior surface of the substrate, the $Si_{1-x}H_x$ film is directly on the exterior surface and is less than 80 Angstroms thick, and the $SiO_2$ film is directly on the $Si_{1-x}H_x$ film and is 1000 to 1700 Angstroms thick.

7. The glazing unit of claim 5 wherein the $Si_{1-x}H_x$ film has a thickness between 30 and 80 Angstroms, the $SiO_2$ film is directly over the $Si_{1-x}H_x$ film and has a thickness between 1200 and 1600 Angstroms, and x is between 0.05 and 0.2.

8. The glazing unit of claim 5 further comprising an anti-reflective film on a second surface of the substrate substantially opposite the first surface.

9. A glazing unit comprising a substrate and an anti-reflective coating on a surface of the substrate, the anti-reflective coating comprising an $Si_{1-x}H_x$ film directly on the surface of the substrate and having a thickness of about 50 Angstroms, and a $SiO_2$ film directly on the $Si_{1-x}H_x$ film having a thickness of about 1400 Angstroms, x being about 0.11, the glazing unit having at least about 70% transmittance and less than about 8% reflectance of visible light.

10. A laminated glazing unit comprising a first ply, a substantially inextensible substrate ply having a first surface laminated to the first ply by a laminating layer of flexible polymeric material, and an anti-reflective coating on a second surface of the substrate ply, the second surface being substantially parallel and coextensive with, and opposite to, the first surface, the anti-reflective coating comprising an $Si_{1-x}H_x$ film directly on the surface of the substrate ply and a $SiO_2$ film directly over the $Si_{1-x}H_x$ film, x being a positive number less than 0.4, the laminated glazing unit having a transmittance of at least 50% to visible light incident on the anti-reflective coating.

11. The laminated glazing unit of claim 10 wherein the first and substrate plys each is glass and the laminating ply is polyvinylbutyral.

12. The laminated glazing unit of claim 10 wherein the $Si_{1-x}H_x$ film has a thickness between 30 and 80 Angstroms, x is between 0.05 and 0.2, the $SiO_2$ film has a thickness between 1200 and 1600 Angstroms and the glazing unit has above 70% transmittance and less than 8% reflectance of visible light incident on the anti-reflective coating.

13. The laminated glazing unit of claim 12 wherein the $Si_{1-x}H_x$ film is about 50 Angstroms thick, x is about 0.11, and the $SiO_2$ film is about 1400 Angstroms thick.

14. A method of making a glazing unit with an anti-reflective coating said glazing unit having a transmittance of at least 50%, the method comprising depositing an $Si_{1-x}H_x$ film on a surface of a substrate ply of the glazing unit and then depositing a $SiO_2$ film over the $Si_{1-x}H_x$ film, wherein x is a positive number less than 0.45.

15. The method of claim 14 wherein said films are deposited by sputtering, the $Si_{1-x}H_x$ film being between 30 and 80 Angstroms thick and the silicon dioxide film being between 1200 and 1600 Angstroms thick.

16. The method of claim 14 wherein the substrate ply of the glazing unit is a glass ply with a thin interfacial film of silicon directly on the surface thereof and the method further comprises heating the glass ply with the silicon film thereon to an elevated temperature for a period of time sufficient to alter its optical properties prior to depositing the $Si_{1-x}H_x$ and $SiO_2$ films thereon.

17. The method of claim 16 wherein the glass ply is heated to at least 1000° F.

18. The method of claim 16 wherein the elevated temperature is approximately the bending temperature of the glass ply and the period of time is about fifteen minutes.

19. A method of making a laminated glazing unit having a transmittance of at least 50%, comprising the steps of:

A) depositing a 30 to 80 Angstroms thick $Si_{1-x}H_x$ film onto a major surface of a substantially inextensible substrate ply, wherein x is a positive number less than 0.40, by sputtering silicon in an atmosphere comprising hydrogen;

B) then depositing a 1200 to 1600 Angstrom thick $SiO_2$ film directly over the $Si_{1-x}H_x$ film by sputtering silicon in an atmosphere comprising oxygen; and C) then sandwiching a flexible polymeric laminating ply between the substrate ply and an additional ply and laminating the same, the major surface with the anti-reflective coating therein being an exterior surface of the glazing unit.

* * * * *